May 1, 1945.   R. J. MILLER   2,374,828
MOTION PICTURE PROJECTOR
Filed May 1, 1941   3 Sheets-Sheet 1

INVENTOR.
RAYMOND J. MILLER
BY
*a. b. Wilson.*
ATTORNEY

INVENTOR.
RAYMOND J. MILLER
BY a. E. Wilson.
ATTORNEY

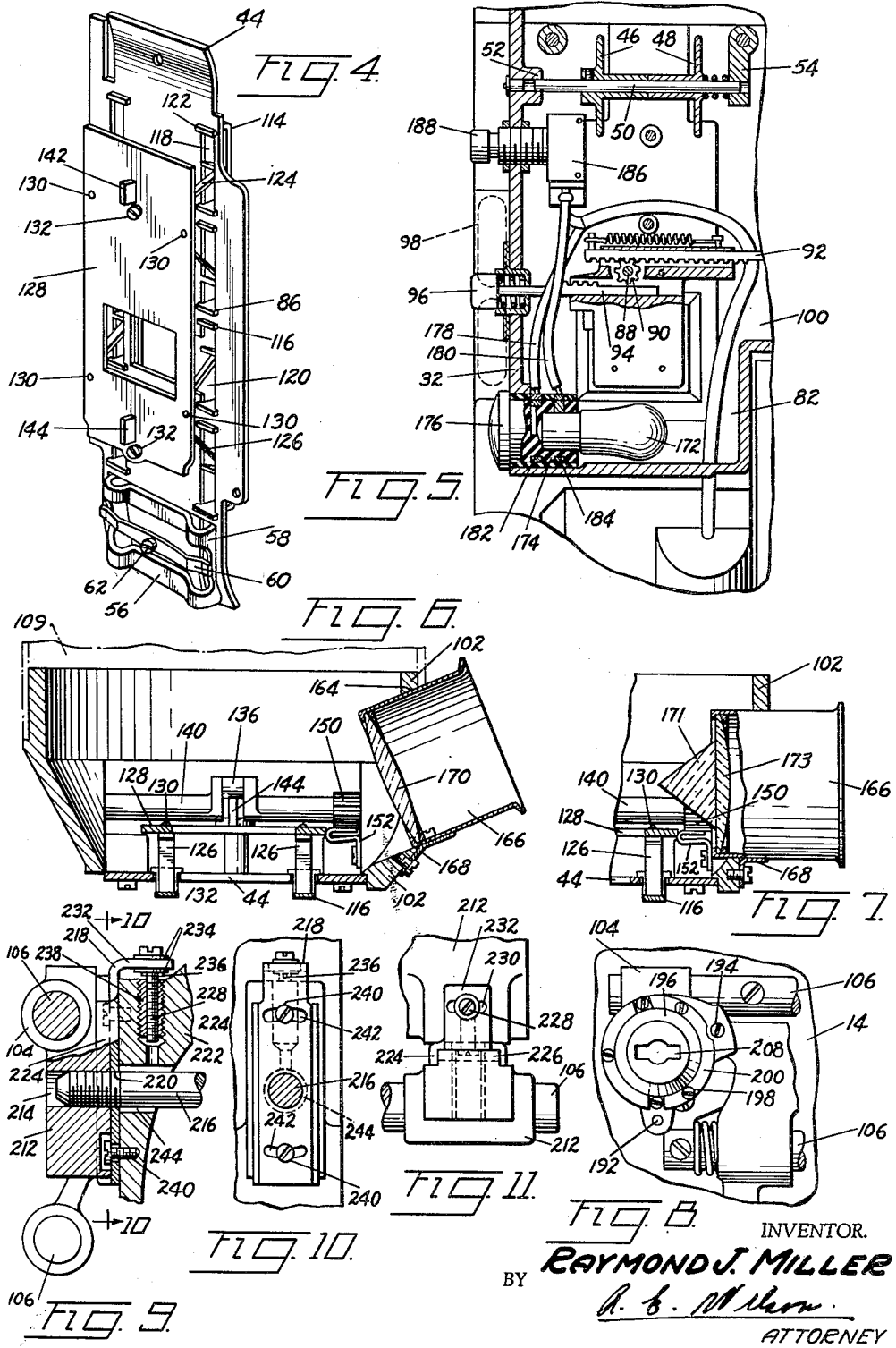

Patented May 1, 1945

2,374,828

UNITED STATES PATENT OFFICE 2,374,828

MOTION-PICTURE PROJECTOR

Raymond J. Miller, Detroit, Mich., assignor to American Pattern and Manufacturing Co., Detroit, Mich., a copartnership consisting of said Miller and Alfred E. Wilson, Detroit, Mich.

Application May 1, 1941, Serial No. 391,258

10 Claims. (Cl. 88—17)

This invention relates to motion picture projectors and more particularly to an improved aperture plate adjustably mounted on a carrier arm to resiliently urge spaced frames of strip film into engagement with film tracks associated with an aperture plate, and wherein means are provided to enable the operator to determine the location of the film frames relative to the aperture of the plate.

In the operation of motion picture projectors, independent visual images carried by a strip of film of any suitable material are successively aligned with an aperture in a plate and are projected onto a screen by a light directed through the aperture and film.

Means such for example as an aperture pressure plate having a plurality of spaced film engaging members or shoes may be provided to yieldingly urge the film into engagement with spaced film tracks positioned adjacent the aperture.

It is desirable that the aperture pressure plate and film shoe guide plate be so mounted in a pressure plate housing that they can be separated from the aperture plate and film tracks to enable the operator to thread film into the projector. To facilitate manufacture of the projector and also to improve its operation by compensating for wear, it is desirable that the film shoe guide plate and the pressure plate be vertically and horizontally adjustable relative to the aperture plate, film tracks and the film driving means employed to intermittently align successive film frames with the aperture.

I have found that better results are attained if the unsprung weight of the film engaging shoes employed to resiliently urge the film into engagement with the film tracks is minimized.

It is also desirable that means be provided to vary the pressure exerted by the film engaging shoes to compensate variations of film thickness, and variations of the texture of the film due to age, since greater pressure should be exerted by the film engaging shoes when new film is being used than is exerted when old film is being used in the projector. Better results are also attained if means be provided to permit varying of the pressure exerted by longitudinally spaced film engaging shoes. For example, more stabilized control of the film results if the film engaging shoes beyond the aperture exert slightly greater pressure on the film than the shoes positioned ahead of the aperture.

To enable the operator to determine the position of a film frame relative to the aperture of the aperture plate, it has been customary to employ a framing light so mounted that it could be moved into the path of the projecting light through the aperture whereby the operator could observe the position of a film frame relative to the aperture to determine whether or not the film was threaded into the projector "in frame." This method of framing has been objectionable because it necessitated an extra operation on the part of the operator to move the framing light into an operative position, and unless carefully manipulated the framing light would not always lie in the same position relative to the aperture whereby inaccuracies of framing might result.

An object of this invention is therefore to provide an improved film shoe guide and pressure plate having a plurality of relatively small film engaging shoes having minimum unsprung weight.

A further object is to provide adjustable means to vary the pressure exerted on the film by spaced film engaging shoes.

Another object of the invention resides in the provision of vertically and horizontally adjustable means to vary the position of the film shoe guide and pressure plates relative to the film tracks and the intermittently driven sprocket employed to align successive film frames with the aperture.

A still further object is to provide improved framing means whereby the position of a film frame relative to the aperture may be readily observed.

Still a further object of the invention is to provide readily accessible manually operable means whereby the pressure plate and its associated housing may be removed from its carrier for cleaning, inspection or repair without disturbing the adjustment of the film shoe guide plate relative to the film guiding and driving means.

Another object is to provide vertically and horizontally adjustable mounting means for detachably connecting a pressure plate housing to a carrier arm in such a manner that the position of film guide shoes relative to film tracks can be varied, and the contact position of a film guide shoe relative to an intermittently driven sprocket may be readily adjusted.

Yet another object of the invention resides in the provision of a viewer carried by the pressure plate housing and cooperating with a fixed framing light positioned adjacent the aperture of the aperture plate but out of alignment with the path of the projecting light whereby the operator can readily determine the position of a film frame relative to the aperture when threading the projector.

Another object is to provide a projector having simplified and rugged film guiding means which may be economically manufactured.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 4 is a perspective view of the film shoe guide and pressure plates.

Fig. 5 is a part sectional view taken substantially on the line 5—5 of Fig. 2 looking in the direction of the arrows.

Fig. 6 is a sectional view through the pressure plate housing at the eye piece looking downwardly.

Fig. 7 is a view similar to Fig. 6 showing a modified form of viewer.

Fig. 8 is a fragmentary elevational view of one desirable form of bracket for adjustably attaching the pressure plate housing to a carrier arm.

Fig. 9 is a fragmentary sectional view of a modified form of attaching bracket.

Fig. 10 is a sectional view taken substantially on the line 10—10 of Fig. 9 looking in the direction of the arrows.

Fig. 11 is a top plan view of the attaching bracket illustrated in Figs. 9 and 10.

Figure 1:
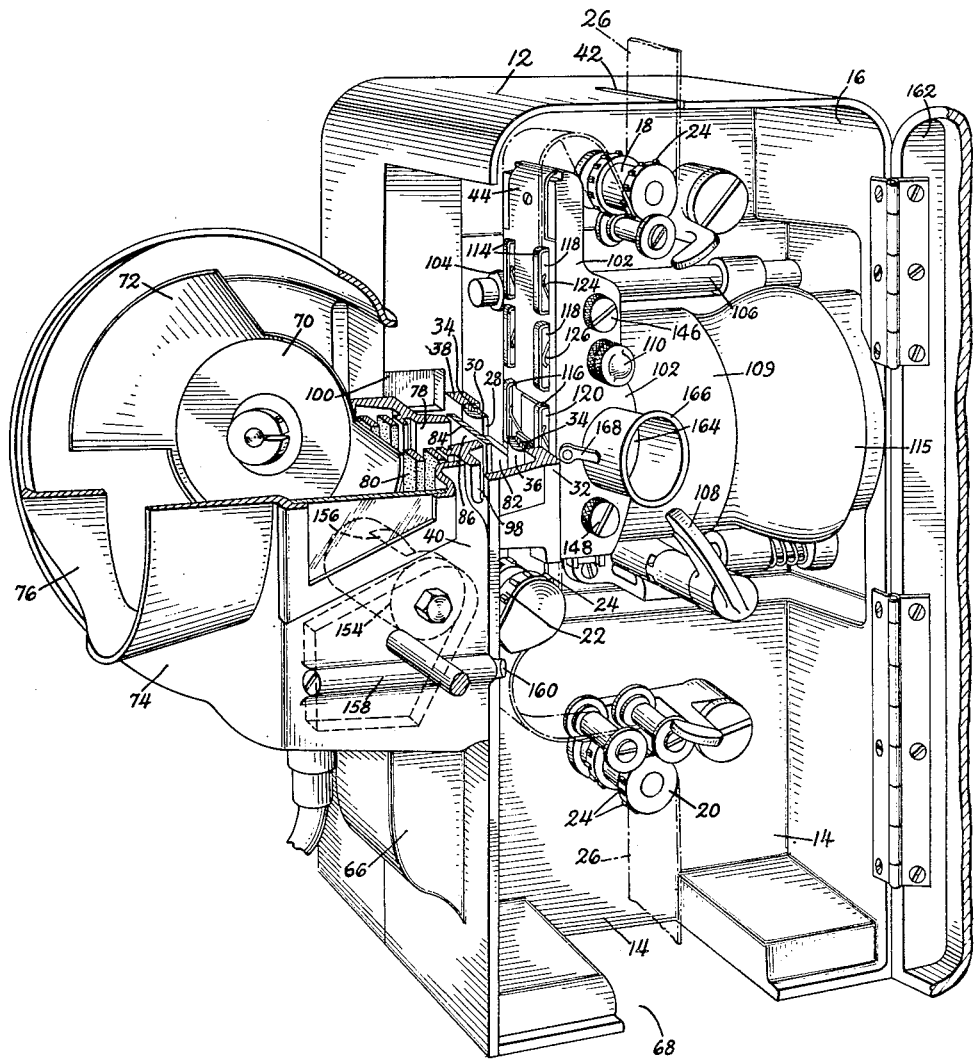
Fig. 1 is a perspective view of a motion picture projector embodying the present invention.
Figure 2:
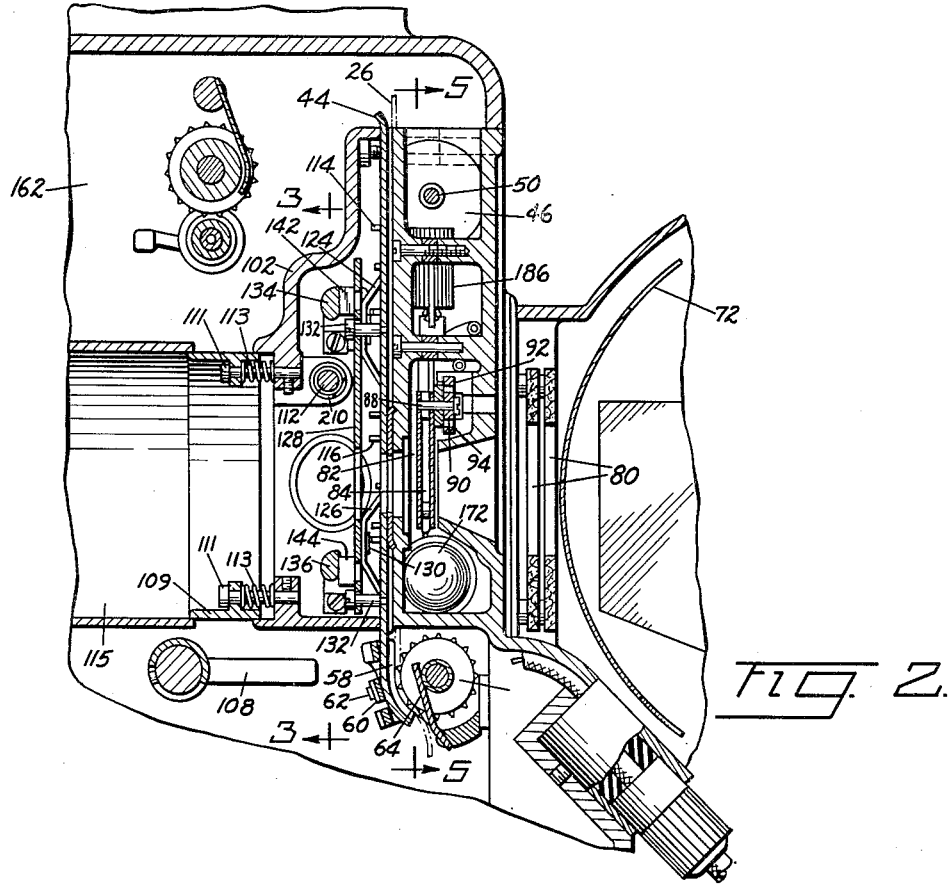
Fig. 2 is a longitudinal sectional view of the projector through the aperture pressure plate.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawings, it will be observed that the invention is illustrated as being embodied in a motion picture projector having a main casing 12. The space within the casing 12 is preferably divided by a substantially vertically extending intermediate wall 14 into a film compartment 16 and a mechanism compartment.

Upper and lower film driving sprockets 18 and 20 and an intermittently driven sprocket 22 project through the intermediate wall 14 and are provided with radially extending sprocket teeth 24 adapted to engage within spaced apertures in film 26 to drive it. The sprockets 18 and 20 are driven by suitable gearing in the mechanism compartment to move the film at a substantially predetermined speed. The intermittently driven sprocket 22 is driven from the mechanism compartment by a suitable intermittence driving mechanism to momentarily align successive film frames with an aperture 28 formed in an aperture plate 30 carried by an aperture plate housing 32.

The aperture plate 30 is preferably supported between film tracks 34 and film track carrier 36 aligned with the aperture plate housing 32 and with a wall 38 extending transversely from the intermediate wall 14 and spaced forwardly from a back wall 40 of the main casing 12.

The film 26 is drawn into the film compartment 16 through a slot 42 formed in the upper wall of the casing 12 by the upper film driving sprocket 18. After leaving the sprocket 18 the film is directed over the top of a shoe guide plate 44 between film guide rollers 46 and 48 mounted on a shaft 50 carried by bosses 52 and 54 associated with the aperture plate housing 32. The film 26 is then intermittently moved downwardly by the intermittently driven sprocket 22 to momentarily align successive film frames with the aperture 28.

The film 26 is maintained in contact with the sprocket teeth 24 of the intermittently driven sprocket 22 by a film tension shoe 56 which comprises an intermittence sprocket shoe 58 so proportioned as to follow the general contour of the intermittently driven sprocket 22 and maintain the film in engagement with the sprocket teeth 24.

Means such for example as a spring 60 may be provided to yieldingly urge the intermittence sprocket shoe 58 towards the intermittently driven sprocket 22 to exert sufficient pressure on the film 26 to prevent disengagement of the film from the sprocket teeth 24. The spring 60 may be adjustably mounted on a screw 62 threaded into the film shoe guide plate 44 whereby the pressure exerted on the film by the intermittence sprocket shoe 58 can be varied to maintain the film under a desired tension. A stripper plate 64 may be provided to prevent the film 26 from winding up on the sprocket 22 in the event of film breakage.

After leaving the sprocket 22 the film preferably forms a backwardly directed loop extending into an outwardly flared portion 66 of the back wall 40. The film is then directed over the lower film driving sprocket 20 and is discharged from the film compartment 16 through an opening 68 preferably communicating with a sound head.

Projecting light is directed towards the aperture 28 from a suitable light source preferably positioned behind the projector. A shutter of any suitable form such for example as a rotatable member 70 having angularly inclined blades 72 may be provided to intermittently interrupt the flow of projecting light into the film compartment 16 to prevent streaking as successive frames of the film 26 are moved into alignment with the aperture 28 and to prevent visible flicker. The shutter is mounted in a housing 74 having a back light admission port 76 aligned with an inwardly directed baffle 78 formed in the back wall 40.

Suitable heat shields 80 preferably positioned between the shutter and the back wall 40 of the casing 12 may be provided to retard the flow of heat from the projecting light into a cooling chamber 82. A movable fire valve 84 may be provided to lie between a front light admission port 86 adjacent the forward end of the baffle 78 and the aperture 28 to interrupt the flow of projecting light when the projector is not operating at a desired substantially predetermined speed.

The fire valve 84 may be carried by a shaft 88 having a pinion 90 meshing with a rack 92 actuated by speed controlled means driven from the mechanism compartment to maintain the fire valve 84 in the open or unobstructing position when the projector is operating at a substantially predetermined speed. The fire valve 84 may also be manually actuated by a rack 94 controlled by a plunger 96 suitably positioned in the film compartment 16.

The cooling chamber 82 preferably communicates with atmosphere on opposite sides of the aperture plate 30 and film track carriers 36 through inlet ports 98 formed in the back wall 40 and outlet ports communicating with the cooling chamber 82 through a manifold passage 100, and an impeller preferably driven by the rotatable member 70 of the shutter.

The shoe guide plate 44 is mounted in a pressure plate housing 102 mounted on a carrier arm 104. The carrier arm 104 is slidably mounted on a plurality of vertically spaced generally horizontally disposed rods 106 extending longitudinally in the film compartment 16 and attached to the intermediate wall 14.

Motion transmitting means controlled by a lever 108 positioned between the housing 102 and a fixed portion of the projector may be provided to move the pressure plate housing 102 and the pressure shoe guide plate 44 away from the aperture plate 30 and film tracks 34 to enable the operator to thread film into the projector. A telescoping light shield in the form of a ring 109 mounted on studs 111 carried by the housing 102 may be yieldingly urged by springs 113 towards a lens tube 115 to enable the housing 102 to separate from the aperture plate to permit the operator to thread film into the projector and to facilitate removal of the pressure plate housing from the film compartment. The lens tube 115 is supported on a plurality of the vertically spaced horizontally extending rods 106 by a lens tube carrier arm 117.

A knob 110 carried by a locking shaft 112 may be provided to project through the pressure plate housing 102 to enable the operator to readily remove the pressure plate housing 102 and shoe guide and pressure plates from the carrier arm 104 to clean or adjust them.

A plurality of vertically spaced relatively small film engaging shoes 114 and 116 may be provided to yieldingly urge the film 26 into engagement with the film tracks 34 to maintain the film in a substantially predetermined spaced relation relative to the aperture 28. The film engaging shoes 114 and 116 project through slots 118 and 120 formed in the shoe guide plate 44 and are provided with laterally extending projections 122 which prevent the shoes from passing completely through the slots 118 and 120.

Means may be provided to vary the pressure exerted on the film by each of the film engaging shoes. One illustrative example of a mechanism for varying the pressure exerted by spaced shoes comprises a pressure plate 128 floatingly mounted relative to the shoe guide plate 44 and having independent vertically spaced springs such as those illustrated at 124 and 126 interposed between the pressure plate 128 and each of the film engaging shoes 114 and 116. The springs 124 and 126 may be operably connected to the pressure plate 128 by suitable screws 130. The pressure plate 128 is thus resiliently mounted on the shoe guide plate 44 and is guided by screws 132 in such a manner that the pressure plate can vary its position angularly to equalize the pressure exerted by the springs on each side of the shoe guide plate 44.

Means may be provided to independently vary the pressure exerted on the film by the vertically spaced film engaging shoes 114 and 116. One desirable form of such pressure varying means comprises cam members 134 and 136 carried by vertically spaced shafts 138 and 140 journalled in the pressure plate housing 102 and engaging vertically spaced cam followers 142 and 144 carried by the pressure plate 128. The shafts 138 and 140 project beyond the outer edge of the pressure plate housing 102 and are provided with knobs 146 and 148 whereby they may be independently rotated to vary the pressure exerted by the vertically spaced shoes 114 and 116. The shafts 138 and 140 may be formed with serrated end portions 150 adapted to be engaged by a spring pressed locking clip 152 to prevent the shafts from rotating to vary the pressure exerted on the shoes until subjected to a substantially predetermined manual rotating force.

Attention is called to the fact that the unsprung weight of the film engaging shoes 114 and 116 is minimized because a relatively large number of relatively small and light shoes are employed. Each of the shoes is yieldingly urged towards the film tracks 34 by its individual spring so that any disturbance caused by the film is not transmitted to the next shoe. Such disturbance of the film may be caused by a variation in thickness of film or by the presence of a splice in the film where two pieces of film have been joined together. When this splice passes through between the film engaging shoes and the film tracks it is necessary for the shoes to move away from the tracks to allow the splice to pass. Thus it will be seen that if the unsprung weight of the film engaging shoes is low they will recover their original position more rapidly than if the unsprung weight of the shoes were high. Also, it will allow the patch to pass through with less resistance since the inertia is low. It will be noted that only one pair of shoes is effected at a time by the patch while the remaining shoes are performing their function uninterrupted. This all goes to produce a steadier alignment of the film resulting in a minimum disturbance of the picture on the screen.

It will be noted that it is possible to vary the pressure exerted on the film by the upper and lower film engaging shoes 114 and 116 respectively. For example, the lower shoes 116 positioned closer to the intermittently driven sprocket 22 may be adjusted to exert greater pressure on the film 26 than the upper film engaging shoes 114 to give more stabilized control of the film.

Means maintained in a fixed relation relative to the projector may be provided to enable the operator to observe the position of a film frame relative to the aperture 26 to determine whether the film is threaded into the projector "in frame."

One desirable form of such framing means comprises a framing light maintained in a fixed position out of alignment with the path of the projecting light, and a viewing port positioned on the opposite side of the aperture 28 whereby the position of the frame lines of the film relative to the aperture defining marginal walls of the aperture plate can be observed by the operator.

As illustrated in Fig. 1, a framing light may be provided in a housing 154 located outside of the main casing 12 of the projector and out of the path of the projecting light through the shutter housing 74. The framing light housing 154 is provided with a cutout portion 156 directed towards the aperture 28. The framing light positioned in the housing 154 may be of any suitable type such for example as an electric light and may be controlled by a switch 158 having a plunger 160 preferably positioned adjacent the back wall 40 so as to be actuated by the marginal edge of a door 162 hinged to the main casing 12. The switch 158 is operably connected with the framing light in such a manner that when the door 162 is in the position to close the film compartment 16, the framing light is off. When the door 162 is opened the plunger 160 of the switch 158 moves longitudinally to actuate the switch and close the electrical contacts to light the framing light positioned in the housing 154.

A viewing port 164 may project through the wall of the pressure plate housing 102 in alignment with the aperture 28 and the cutout portion 156 of the housing 154 whereby the light rays from the framing light may project through the cutout portion 156; aperture 28 and film to enable the operator to observe whether the film is threaded "in frame" with reference to the aperture 28.

As more clearly illustrated in Fig. 6, the viewing port 164 may comprise an eye piece 166 projecting through the pressure plate housing 102 and suitably attached thereto as by means of a clamp 168. If desired, the eye piece 166 may be provided with a lens 170 of suitable proportions such for example as a bi-convex lens to magnify the aperture 28 to magnify the image of the viewed frame.

Referring now to Fig. 7, it will be observed that if desired a prism 171 may be provided to collect light from the rectangular shaped aperture 28 and direct it to a lens 173 preferably of the plano-convex type whereby the view of the image of the film frame is extended and magnified to bring it to a position more convenient for the operator to check.

In the embodiment of the invention illustrated in Fig. 5 a framing light is positioned within the cooling chamber 82 out of alignment with the projecting light. This framing light comprises an electric light bulb 172 mounted in a socket 174. The socket 174 preferably has a knurled knob 176 extending through the wall of the aperture plate housing 32 whereby the socket may be readily removed to replace burned out bulbs. Electric current is supplied to the bulb 172 through suitable wires 178 and 180 operably connected to metal rings 182 and 184 respectively connected with the contact points of the bulb 172.

The wire 180 is preferably connected with a switch 186 having a plunger 188 positioned to be actuated by the door 162 to extinguish the framing light when the door is in the position to close the film compartment 16.

Attention is called to the fact that when the door 162 of the film compartment 16 is opened the framing light 172 is automatically turned on whereby the operator can observe the position of the spaced frames of the film through the viewing port 164. With the embodiment of the invention illustrated in Fig. 5 it is not necessary to hold the fire valve 84 open because the framing light is positioned at such an angle as to project through the aperture 28 even though the fire valve 84 is in the position to close the front light admission port 86 formed in the shutter housing 74 adjacent the end of the inwardly directed baffle 78. The operator thus has both hands free to position the film in the proper position with reference to the film guiding and driving means and to manipulate the aperture pressure plate.

Means may be provided to mount the pressure plate housing 102 on the housing carrier arm 104 in such a manner that it may be adjusted vertically and horizontally to properly align it with the aperture plate housing 32.

Figure 3:
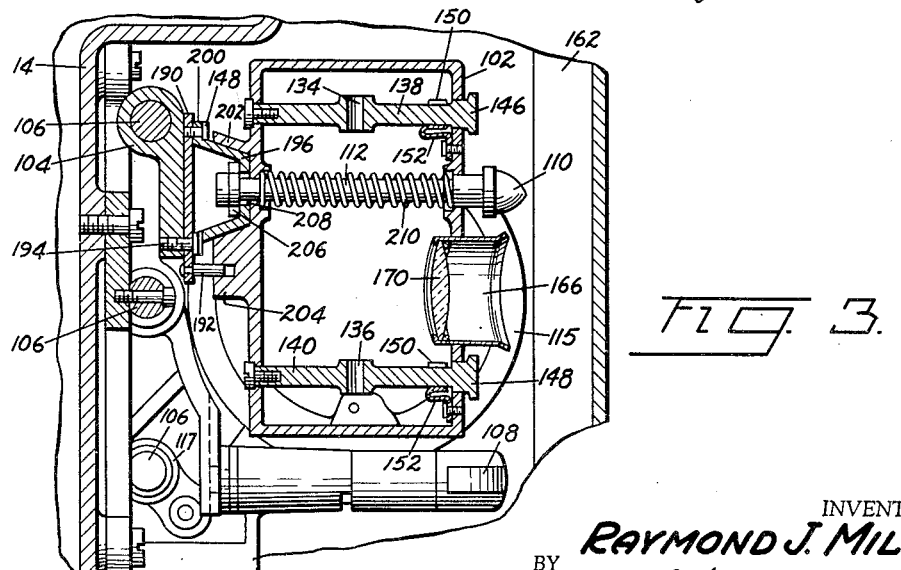
Fig. 3 is a sectional view taken substantially on the line 3—3 of Fig. 2 looking in the direction of the arrows.

One desirable form of such adjustable mounting means comprises an adjustable locking device more clearly shown in Figs. 3 and 8. The arrangement of the parts is such as to permit ready removal of the pressure plate housing 102 as a unit from the film compartment 16 of the projector.

The carrier arm 104 is provided with a plate 190 having a laterally extending pin 192 projecting therefrom. The plate 190 may be secured to the arm 104 by a plurality of screws 194 projecting through generally arcuate shaped slots in the plate 190 whereby the plate may be rotated slightly relative to the arm 104 to adjust the vertical position of the pressure plate housing 102 relative to the aperture plate housing 32.

A male cone 196 may be secured to the plate 190 by a plurality of screws 198 projecting through vertically extending slots in a flange 200 carried by the male cone 196 whereby the cone can be elevated or lowered slightly relative to the plate 190 to adjust the contact position of the intermittence sprocket shoe 56 relative to the intermittently driven sprocket 22.

The pressure plate housing 102 is provided with a laterally extending female cone 202 adapted to receive the male cone 196 and is also provided with an apertured boss 204 adapted to receive the pin 192.

The pressure plate housing 102 may be locked and unlocked in position on the male cone 196 by a locking key 206 carried by the locking shaft 112 and adapted to project inside the male cone 196 through a slot 208. The locking key 206 is actuated by the locking shaft 112 having the actuating knob 110 and is maintained in locking position by the tension of a spring 210.

Frequent removal of the pressure plate housing 102 is desirable in order to permit cleaning of the pressure plate; housing and the film tracks and shoes. The removal of the aperture pressure plate housing as a unit is accomplished by turning the locking key 206 from the vertical position to the horizontal position so that it is aligned with the slot 208. In this position the locking key 206 can be withdrawn and the entire pressure plate housing 102 may then be removed from the male cone 196.

In replacing the pressure plate housing, primary adjustment is obtained by the guide pin 192 carried by the plate 190 entering the aperture of the boss 204. Complete alignment is obtained by contact of the female cone 202 with the male cone 196. The actuating knob 110 of the locking shaft 112 having the locking key 206 is then pressed inwardly to compress the spring 210 until the locking key 206 projects through the slot 208 and occupies a position inside the male cone 196. The knob 110 is then rotated 90° and the locking key 206 fits into shallow grooves on the inside of the male cone 196 as illustrated by the position occupied by the locking key 206 of Fig. 3. When the key 206 is moved to the locked position the knob 110 is released whereupon the spring 210 holds the parts securely in the assembled position because the pressure plate housing 102 is firmly supported and aligned at vertically spaced points on the cooperating cones 196 and 202 and by the pin 192 and apertured boss 204.

Figs. 9 to 11 disclose a modified form of adjustable means for mounting the pressure plate housing 102 on the vertically spaced horizontally extending rods 106 in the film compartment 16.

A carrier arm 212 slidably mounted on a plurality of the vertically spaced rods 106 is provided with a threaded aperture 214 to receive a locking shaft 216. A plate 218 having an aperture 220 to receive the shaft 216 in close contact therewith is interposed between the carrier arm 212 and a body section 222 of the pressure plate housing 102. The plate 218 is channel shaped and is provided with spaced flanges 224 positioned to engage the marginal edge portions 226 of the carrier arm 212 to maintain the pressure plate housing 102 in a predetermined adjusted position relative to the film tracks 34 and the intermittently driven sprocket 22.

Means may be provided to vary the vertical position of the pressure plate housing 102 relative to the carrier arm 212. One desirable form of means for obtaining the desired vertical adjustment resides in the provision of a bolt 228 projecting through a slot 230 formed in a generally horizontally extending flange 232 carried by the plate 218. The bolt 228 is restrained from moving vertically relative to the flange 232 by any desired means such for example as spaced washers 234 and a pin 236 extending through the bolt 228. If the body section 222 of the housing 102 is made of relatively soft material such for example as aluminum, a bushing 238 of a hard metal may be threaded into the body section 222 to receive the bolt 228 to prevent stripping threads in the body section 222. The bolt 228 is manipulated to position the pressure plate housing 102 in a desired vertical position relative to the carrier arm 212 to adjust the contact position of the intermittence sprocket shoe 58 relative to the intermittently driven sprocket 22.

Means may be provided to vary the vertical plane of the pressure plate housing 102 relative to the carrier arm 212 to align the film shoe guide plate 44 with the film tracks 34. One desirable form of means for obtaining the desired vertical plane adjustment resides in the provision of vertically spaced bolts 240 projecting through slots 242 formed in the plate 218. The slots 242 may be arcuate shaped as illustrated to permit varying the angular relation of the pressure plate housing relative to the carrier arm to align the film shoes with the film tracks.

The slot 230 in the horizontally extending flange 232 of the plate 218 is of sufficient length to permit movement of the body section 222 and screws 240 relative to the plate 218 as the housing 102 is adjusted vertically or angularly, and the slots 242 are of sufficient width vertically to permit vertical movement of the body section on the bolt 228 to adjust the housing 102 vertically to adjust the contact position of the intermittence sprocket shoe 58 relative to the intermittently driven sprocket 22. It will be noted that the housing 102 is thus mounted on the carrier arm 212 in such a manner that it can be moved vertically or angularly to bring the cooperating parts into a desired position of alignment and to compensate wear of the parts.

The locking shaft 216 projects through an enlarged bore 244 in the body section 222 whereby movement of the housing 102 vertically or angularly relative to the plate 218 and carrier arm 212 is permitted to obtain the desired adjusted position. When the desired adjusted position has been obtained the locking screws 240 are tightened to lock the pressure plate housing 102 to the plate 218 thereby positioning the aperture 220 and plate 218 in a desired relationship with the body section 222.

This is a continuation-in-part of my co-pending application Serial No. 250,310, filed January 11, 1939, now Patent Number 2,312,663; issued March 2, 1943. Features disclosed but not claimed herein are being claimed in my copending applications Serial Nos. 547,163, filed July 29, 1944, and 547,164, filed July 29, 1944.

I claim:

1. In a motion picture projector having an aperture plate, a pair of spaced vertically extending film tracks associated with the aperture plate, a plurality of pairs of vertically spaced relatively light film engaging shoes, a shoe guide member supporting said shoes, a pressure plate spaced from the shoe guide member, independent yielding means between the pressure plate and each of the film engaging shoes, and vertically spaced manually operable means projecting laterally from the pressure plate to selectively move the upper or lower ends of the pressure plate relative to the shoe guide member to vary the film engaging pressure exerted by vertically spaced pairs of film engaging shoes.

2. In a motion picture projector having an aperture plate, a pair of spaced vertically extending film tracks associated with the aperture plate, a plurality of pairs of vertically spaced relatively light film engaging shoes, a shoe guide member supporting said shoes, a floating pressure plate spaced from the shoe guide member, independent yielding means between the pressure plate and each of the film engaging shoes whereby each shoe of a pair of vertically spaced shoes exerts pressure substantially equal pressure as the other shoe of the same pair, and independent manually operable means to vary the film engaging pressure exerted by vertically spaced pairs of film engaging shoes.

3. In a motion picture projector, a relatively fixed aperture plate, a pair of film tracks associated with aperture plate, a pressure plate housing movable between operating and threading positions adjacent and spaced from the film tracks, a shoe guide plate having a plurality of spaced apertures carried by the pressure plate housing, a plurality of film engaging shoes positioned in said apertures, a pressure plate spaced from the shoe guide plate and floatingly mounted thereon, spaced yielding means between the pressure plate and each of the film engaging shoes, and spaced manually operable means to vary the pressure exerted by the yielding means on spaced film engaging shoes.

4. A film shoe guide and pressure plate assembly for a motion picture projector comprising a shoe guide plate having a plurality of spaced apertures therein, a plurality of film engaging shoes positioned in said apertures, a pressure plate floatingly mounted relative to the shoe guide plate, separately operable yielding means between the pressure plate and each of the film engaging shoes, spaced cams positioned to engage the pressure plate, and separate manually operable means to actuate each of the spaced cams to vary the tension of the yielding means on spaced film engaging shoes.

5. A film shoe guiding mechanism for a motion picture projector comprising a member supporting a plurality of relatively light independent film engaging shoes, independent yielding means urging each of the film engaging shoes outwardly relative to said member, cam means to vary the pressure exerted by the yielding means on each of the film engaging shoes, and manually operable means extending laterally from the film shoe guiding mechanism to actuate the cam means.

6. In a motion picture projector, a relatively fixed aperture plate, a pair of film tracks associated with the aperture plate, a pressure plate housing movable between operating and threading positions adjacent and spaced from the film tracks, a shoe guide plate having a plurality of spaced apertures carried by the pressure plate housing, a plurality of film engaging shoes positioned in said apertures, a pressure plate spaced from the shoe guide plate and floatingly mounted thereon, spaced cam followers carried by the pressure plate, spaced yielding means between the pressure plate and the film engaging shoes, and spaced manually operable means comprising shafts projecting through the pressure plate housing, cams carried by the shafts and engaging said cam followers to vary the pressure exerted by the yielding means on spaced film engaging shoes.

7. A pressure plate housing assembly for a motion picture projector comprising a housing, a film shoe carrying plate fixed to the housing, a plurality of spaced film engaging shoes mounted in the shoe carrying plate, a pressure plate associated with the shoe carrying plate, separately operable yielding means between each of the film engaging shoes and the pressure plate, and spaced independent manually operable means to move spaced portions of the pressure plate relative to the film shoe carrying plate to vary the pressure exerted on spaced film engaging shoes.

8. A pressure plate housing assembly for a motion picture projector comprising a housing, a film shoe carrying plate fixed to the housing, a plurality of pairs of spaced film engaging shoes mounted in the shoe carrying plate, a pressure plate associated with the shoe carrying plate, yielding means between the film engaging shoes and the pressure plate, and a plurality of spaced independent manually operable means to move the pressure plate relative to the shoe carrying plate to vary the pressure exerted by spaced pairs of film engaging shoes.

9. In a motion picture projector head, an apertured pressure plate and film guide member including a plurality of independently actuated spring pressed film guiding shoes and a spring tension adjustment plate adapted to control the spring pressure on the shoes, adjustment cams communicaitng with said spring tension adjustment plate and adapted to permit varied spring pressures to be exerted on the upper and lower film guiding shoes, said aperture pressure plate film guide member and spring tension adjustment plate being secured together as a unit and removable from and replaceable in said projector as a unit.

10. In a motion picture projector having a film compartment, an aperture plate in the film compartment, a plurality of pairs of vertically spaced film engaging shoes to yieldingly urge a film toward the aperture plate, pressure plate means spaced from the film engaging shoes, independently operable yielding means between spaced portions of the pressure plate means and each of the film engaging shoes urging the shoes towards the aperture plate, and spaced readily accessible manually operable means in the film compartment for changing the position of spaced portions of the pressure plate means to vary the pressure exerted by vertically spaced pairs of film engaging shoes.

RAYMOND J. MILLER.